(12) United States Patent
Berg et al.

(10) Patent No.: US 7,660,695 B2
(45) Date of Patent: Feb. 9, 2010

(54) SEGMENTED ANTENNA SYSTEM FOR OFFSHORE RADIO NETWORKS AND METHOD OF USING SAME

(75) Inventors: Jens Olav Berg, Sandvika (NO); Runar Slinning, Honefoss (NO); Ole Kristian Gregersen, Saetre (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/957,160

(22) Filed: Dec. 14, 2007

(65) Prior Publication Data
US 2008/0122716 A1 May 29, 2008

Related U.S. Application Data

(62) Division of application No. 10/558,586, filed as application No. PCT/EP2004/051052 on Jun. 7, 2004, now Pat. No. 7,383,151.

(30) Foreign Application Priority Data
Jun. 6, 2003 (GB) .................................. 0312997.0

(51) Int. Cl.
*G06F 15/00* (2006.01)
(52) U.S. Cl. .................. 702/150; 340/870.15; 367/176; 370/331

(58) Field of Classification Search ................. 702/150; 343/702, 833, 834, 818, 815; 342/352, 357.01, 342/360, 357.12, 443, 450, 417; 370/331; 340/870.15; 455/451, 452.1; 367/76
See application file for complete search history.

(56) References Cited

U.S. PATENT DOCUMENTS

| | | | | | |
|---|---|---|---|---|---|
| 4,209,790 | A | * | 6/1980 | Newcomb | 343/830 |
| 4,418,351 | A | * | 11/1983 | Fackler | 343/797 |
| 5,758,261 | A | * | 5/1998 | Wiedeman | 455/13.1 |
| 5,831,576 | A | * | 11/1998 | Sheynblat | 342/357.03 |
| 6,437,740 | B1 | * | 8/2002 | De Champlain et al. | 342/417 |

* cited by examiner

*Primary Examiner*—Carol S Tsai
(74) *Attorney, Agent, or Firm*—Ari Pramudji; Richard V. Wells; Kevin McEnaney

(57) ABSTRACT

The present invention provides a method and apparatus for a segmented antenna system. The method includes determining an orientation of a first antenna, the first antenna including a plurality of segments for transmitting and receiving signals, determining a direction from the first antenna to a second antenna capable or at least one of transmitting and receiving signals, and selecting at least one of the plurality of segments of the first antenna using the determined orientation of the first antenna and the determined direction.

27 Claims, 5 Drawing Sheets

SEGMENTED ANTENNA SYSTEM FOR OFFSHORE RADIO NETWORKS AND METHOD OF USING SAME

RELATED APPLICATIONS

This application is a divisional of U.S. application Ser. No. 10/558,586, filed Nov. 29, 2005, now U.S. Pat. No. 7,383,151 and the disclosure of which is herein incorporated by reference; which is a US national phase application of PCT/EP04/51052, filed Jun. 7, 2004, the disclosure of which is herein incorporated by reference; which is an international application of GB Application Number 0312997.0, filed Jun. 6, 2003, and the disclosure of which is herein incorporated by reference.

FIELD OF THE INVENTION

This invention relates generally to a radio network, and, more particularly, to a segmented antenna system for an offshore radio network used in marine seismic surveying.

DESCRIPTION OF THE RELATED ART

Underwater seismic exploration is widely used to locate and/or survey subterranean geological formations for hydrocarbon deposits. A survey typically involves deploying one or more seismic sources and one or more seismic sensors at predetermined locations. For example, a seismic cable including an array of seismic sensors may be deployed on the sea floor and a seismic source may be towed along the ocean's surface by a survey vessel. The seismic sources generate acoustic waves that travel to the geological formations beneath the ocean floor, where they are reflected back to the seismic sensors. The seismic sensors receive the reflected waves, which are then processed to generate seismic data Analysis of the seismic data may indicate probable locations of geological formations and hydrocarbon deposits.

Seismic surveys often use more than one survey vessel. For example, a recording vessel may be dedicated to receiving data collected by one or more survey vessels. For another example, a first survey vessel, sometimes referred to as a shooting boat, may be coupled to a seismic source that generates the acoustic signal. A second survey vessel, sometimes referred to as a recording boat, is coupled to at least one seismic sensor that receives the reflected wave. For yet another example, a deployment vessel may be used to deploy the seismic cable including one or more seismic sensors, a positioning vessel may be used to position and/or re-position the deployed cables, a source vessel may be used to tow one or more seismic sources near the deployed cables, and a recording vessel may be used to record the data. One advantage to using multiple vessels is that a given survey area may be mapped in less time than would be required if the same area was mapped by a single vessel.

When a plurality of survey vessels is used to conduct a marine seismic survey, a large volume of information may be transmitted among the survey vessels. For example, seismic data recorded and at least partially processed by a survey vessel may be transmitted to the recording vessel, where the seismic data may be stored for later processing. For another example, seismic data may be transferred between the shooting boat and the recording boat. Physically connecting the vessels, e.g. by wires or cables, is difficult, or impracticable, because of the large and variable distances separating the various vessels. Consequently, wireless data links are used to transfer data among vessels in the network. For example, radio transmitters and receivers located on the vessels are typically used to form high-speed wireless data links to transfer data between the vessels in the network.

The high-speed wireless data links are typically formed using conventional omni-directional antennas. Vessels separated by a distance larger than the range of the omni-directional antenna may not be able to exchange data via the high-speed wireless link. The range of the high-speed wireless data link may be further reduced by a number of physical effects such as "fading." Fading of the radio signal is caused by reflection of the radio signal from the sea surface. The phase-shifted reflected signal fades out the direct signal in regions of reduced sensitivity called "dead zones" around the vessels. For example, fading of a 2.4 Ghz radio signal may create a dead zone at a range of about 9-10 kilometers.

Interference with other signals and/or noise may also reduce the range of the transmitters and/or receivers. For example, traditional high-speed wireless data links may use unlicensed Industrial, Scientific, and Medical (ISM) frequency bands. The unlicensed ISM bands may also be used by other transmitters, such as those on board other ships in the vicinity of the survey vessels. The signals broadcast by the other transmitters may interfere with the high-speed wireless data link and degrade the quality of the connection. The interference may corrupt the transferred data and/or interrupt the transfer of data altogether. In some cases, the data corruption and/or the interruption of the data transfer may force a suspension of the seismic survey.

Rotating single-segment antennas have been used to extend the range of high-speed data links by increasing antenna sensitivity in a reduced range of angles in the direction of a target. However, the single-segment antennas suffer from at least three drawbacks. First, the position of the target must be continuously monitored. If the target is lost, the data transfer may be interrupted, and in some cases the survey may be stopped, while the target is re-acquired. This problem is exacerbated in marine seismic surveys that use rapidly moving survey vessels, which may also be carried by unpredictable water currents. Second, rotating single segment antennas have large numbers of moving parts, which may reduce the operational lifetime of the rotating single-segment antenna and increase maintenance costs and downtime. Third, the rotating single-segment antenna can only acquire a single target at a time.

SUMMARY OF THE INVENTION

In one aspect of the instant invention, a method is provided for using a segmented antenna system. The method includes determining an orientation of a first antenna, the first antenna including a plurality of segments for transmitting and receiving signals, determining a direction from the first antenna to a second antenna capable of at least one of transmitting and receiving signals, and selecting at least one of the plurality of segments of the first antenna using the determined orientation of the first antenna and the determined direction.

In another aspect of the present invention, a segmented antenna system is provided. The system includes a plurality of antennae deployed at a plurality of locations, at least one of the antennae being a segmented antenna having a plurality of segments, and a plurality of positioning sensors adapted to provide a corresponding plurality of positioning signals indicative of the plurality of locations. The system also includes at least one orientation sensor adapted to provide a signal indicative of an orientation of the at least one segmented antenna and at least one controller adapted to select at least one of the segments of the at least one segmented antenna using the plurality of positioning signals and the at least one orientation signal.

BRIEF DESCRIPTION OF THE DRAWINGS

The invention may be understood by reference to the following description taken in conjunction with the accompanying drawings, in which like reference numerals identify like elements, and in which.

Figure 1:
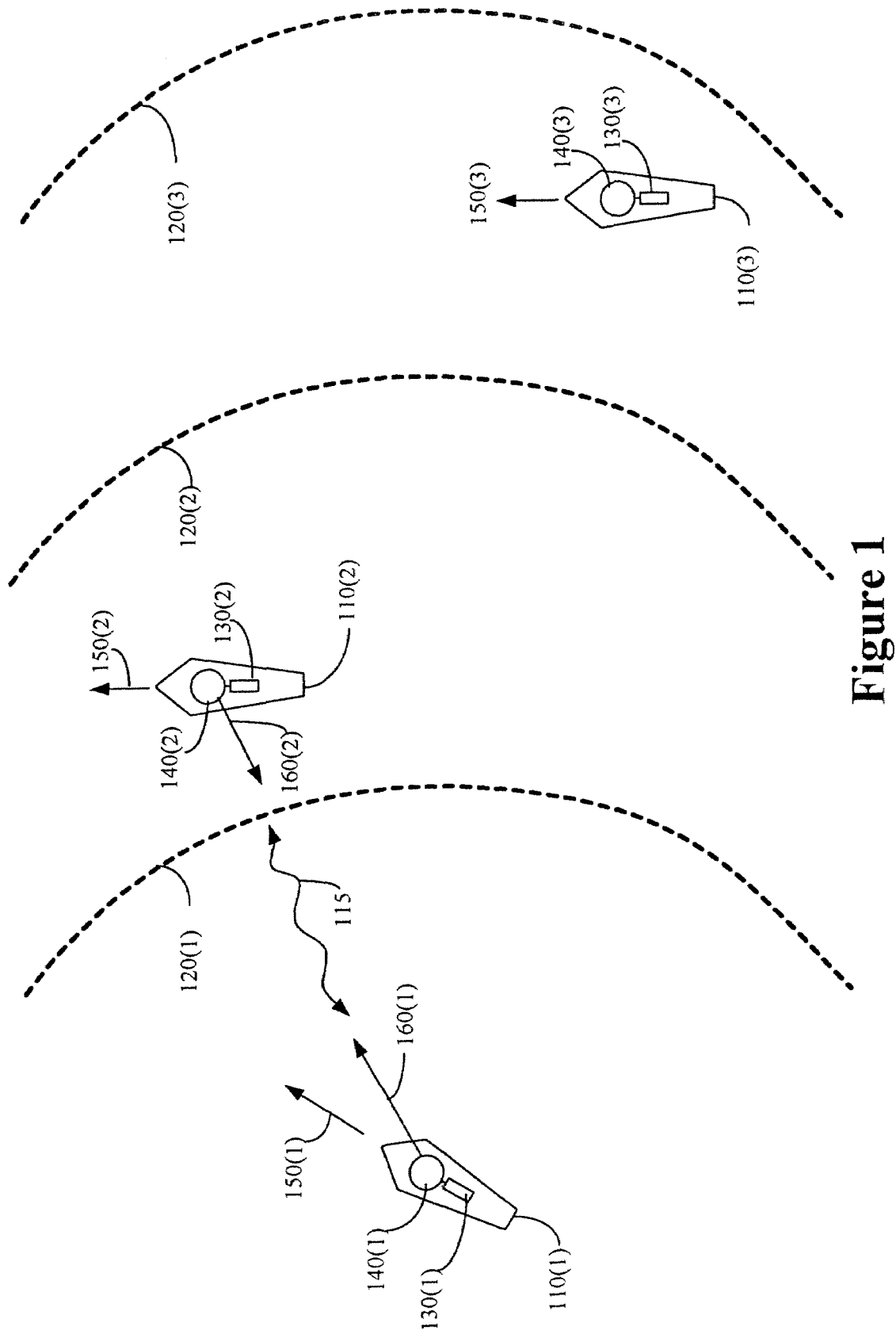
FIG. 1 conceptually illustrates a network of survey vessels.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 conceptually illustrates a plurality of survey vessels 110(1-3). For example, the survey vessels 110(1-3) may be carrying out a marine seismic survey. In one embodiment, the survey vessels 110(1-3) exchange data via a wireless data link 115. For example, the survey vessel 110(1) may be used to gather seismic data collected by the other survey vessels 110(2-3), which transmit the collected seismic data to the survey vessel 110(1) via the wireless data link 115, such as a 2.4 GHz radio connection. However, persons of ordinary skill in the art will appreciate that the plurality of survey vessels 110(1-3) may include any vessel that communicates data via a wireless data link, including a boat, a buoy, and the like; and that the number of survey vessels 110(1-3) and the frequency of the signals are not material to the practice of the invention. The survey vessels 110(1-3) may also form wireless data links with fixed-position vessels like drilling rigs, platforms, on-shore radio towers, and the like. Furthermore, in alternative embodiments, the wireless data link 115 may be established between land-based vehicles (not shown). For example, the wireless data link 115 may be established between a base station (not shown) and one or more mobile vehicles (not shown) used in a land-based seismic survey.

As discussed above, in conventional practice, the wireless data link 115 may be established using an omni-directional antenna (not shown) deployed on the survey vessel 110(1). The range, indicated by a dashed line 120(1) in FIG. 1, of the wireless data link 115 established using a conventional omni-directional antenna is limited by a variety of factors, including fading, interference, and the like. For example, an 8 dB type omni-directional antenna has a range of about 16 kilometers. However, in the illustrated embodiment, the survey vessels 110(2-3) are outside of the range 120(1). Consequently, the survey vessel 110(1) may not be able to exchange data with the survey vessels 110(2-3) via the wireless data link 115 established using a conventional omni-directional antenna.

A segmented antenna system 130(1) in accordance with the present invention is therefore deployed on the survey vessel 110(1) to establish the wireless data link 115 to survey vessels 110(2) within a range 120(2). In operation, the segmented antenna system 130(1) determines an orientation, indicated by the arrow 150(1), of the segmented antenna 140(1). For example, the segmented antenna system 130(1) may determine the orientation 150(1) of the segmented antenna 140(1) relative to true North. The segmented antenna system 130(1) also determines a direction from the segmented antenna 140(1) to a target. For example, the segmented antenna system 130(1) may determine the direction 160(1) from the survey vessel 110(1) to the survey vessel 110(2). Similarly, if a segmented antenna system 130(2) is deployed on the survey vessel 110(2), then the segmented antenna system 130(2) on the survey vessel 110(2) may determine the direction 160(2) from the survey vessel 110(2) to the survey vessel 110(1).

The segmented antenna system 130(1) includes a segmented antenna 140(1) for transmitting and/or receiving signals to and from a target, e.g. the survey vessels 110(2-3). By establishing the wireless data link 115 using the determined orientation 150(1) and the determined direction 160(1), as described in detail below, the range 120(2) of the wireless data link 115 formed with the segmented antenna 140(1) may exceed the range 120(1). For example, the segmented antenna system 130(1) may be able to establish the wireless data link 115 out to a range 120(2) of up to about 20 kilometers at a frequency of about 2.4 GHz. However, it will be appreciated by those of ordinary skill in the art that the exact range 120(2), may depend on a variety of factors including, but not limited to, the height at which the segmented antenna system 130(1) is deployed.

In one set of alternative embodiments, segmented antenna systems 130(2-3) having segmented antennas 140(2-3) may also be deployed on the survey vessels 110(2-3). Deploying the segmented antenna systems 130(2-3) on the survey vessels 110(2-3), and using them in the manner described below, may further extend the range 120(2) over which the wireless data link 115 may be established. For example, the segmented antenna system 130(1) may be able to establish the wireless data link 115 with the segmented antenna system 130(2) out to a range of up to about 30 kilometers at a frequency of about 2.4 GHz.

Figure 2:
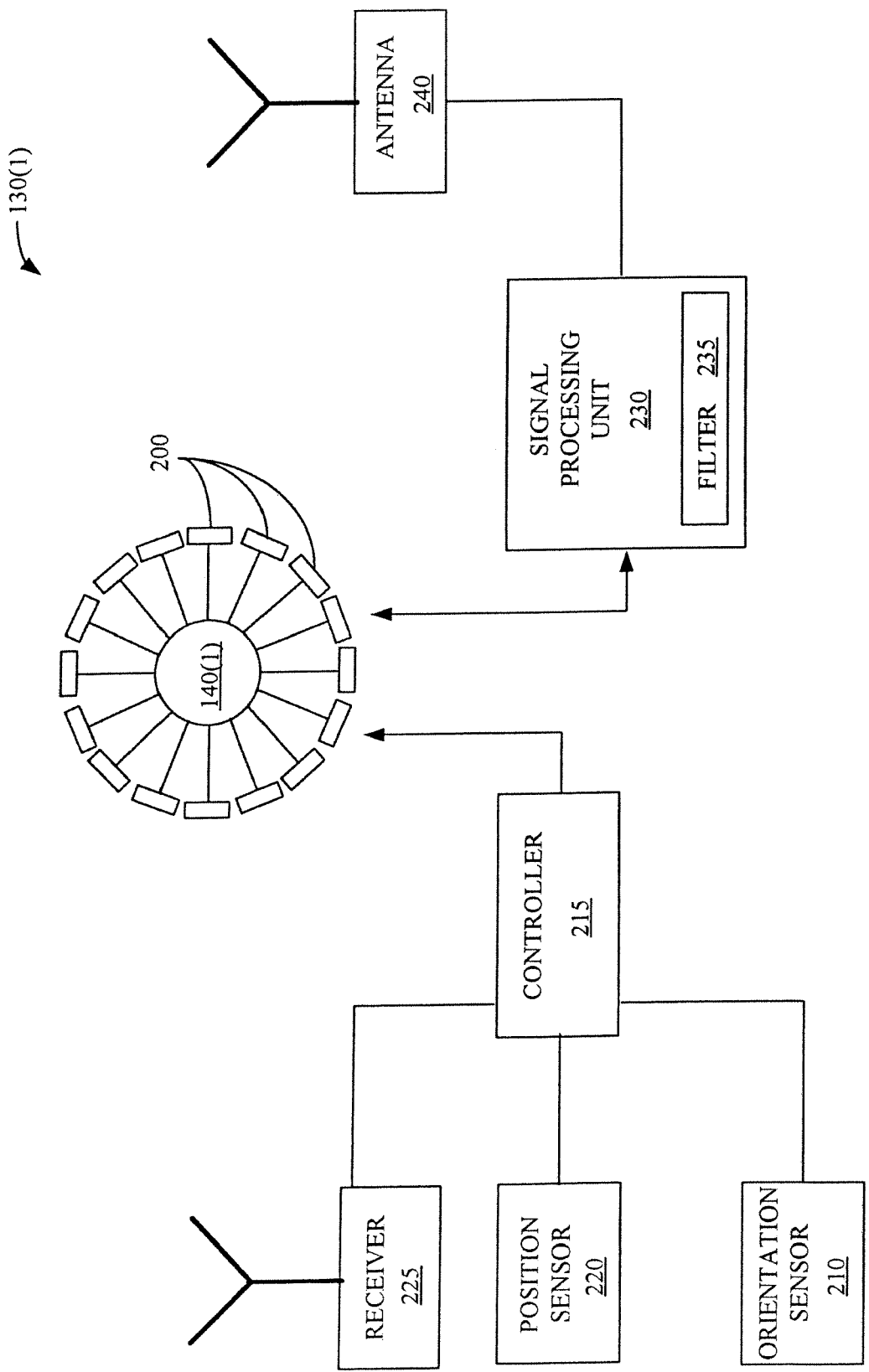
FIG. 2 conceptually illustrates an exemplary embodiment of a segmented antenna system that may be used to transmit data in the network illustrated in FIG. 1.

FIG. 2 conceptually illustrates an exemplary embodiment of the segmented antenna system 130(1) including the segmented antenna 140(1). The segmented antenna 140(1) includes a plurality of segments 200 (not all indicated) capable of transmitting and/or receiving signals. For example, in one embodiment, each of the plurality of segments 200 may include a radio transmitter/receiver (not shown) capable of transmitting and/or receiving radio signals. In the illustrated embodiment, the segmented antenna 130(1) includes 16 segments 200 that may transmit and/or receive signals within partially overlapping angles that subtend about 26.degree. and overlap by about 4.degree. Thus, the segmented antenna 140(1) may transmit and/or receive signals throughout about 360.degree. However, persons having benefit of the present disclosure will appreciate that the number, degree of overlap, and angular extent of the segments 200 is a matter of design choice.

Although not necessary for the practice of the present invention, in one embodiment, a plurality of the segments 200 may transmit and/or receive separate signals concurrently with each other. For example, the segments 200 may each include a radio transmitter/receiver (not shown) that is capable of transmitting and/or receiving signals independently of, and concurrently with, the other radio transmitter/receivers. In the illustrated embodiment, the segmented antenna 130(1) may be capable of forming up to 16 concurrent wireless data links with up to 16 separate vessels, such as the survey vessels 110(1-3) shown in FIG. 1.

In the embodiment illustrated in FIG. 2, an orientation sensor 210 is coupled to a controller 215 in the segmented antenna system 130(1). The orientation sensor 210 is capable of determining the orientation 150(1) of the segmented antenna 140(1). For example, when the segmented antenna 140(1) is deployed on the survey vessel 10(1) shown in FIG. 1, the orientation sensor 210 is capable of determining the orientation 150(1) of the segmented antenna 140(1) by determining a heading of the survey vessel 110(1). In one embodiment, the orientation sensor 210 is a gyrocompass that determines the heading of the survey vessel 110(1) relative to true North. For example, in one embodiment, the gyrocompass 210 may use an NMEA 0183 data interface or, in an alternative embodiment, an NMEA 2000 data interface having a high-speed option. However, in alternative embodiments, the orientation sensor 210 may not include a gyrocompass and may instead determine the orientation of the segmented antenna system 130(1) using GPS positioning information. In other alternative embodiments, the orientation sensor 210 may determine the orientation of the segmented antenna system 130(1) using any of a variety of compass sensors known to those of ordinary skill in the art. The orientation sensor 210 is also capable of forming a signal indicative of one or more determined parameters, such as the determined orientation 150(1), and providing the signal indicative of the one or more determined parameters, such as the determined orientation 150 (1), to the controller 215.

In the illustrated embodiment, the controller 215 in the segmented antenna system 130(1) determines the direction to the target using a position sensor 220 and a receiver 225 that are coupled to the controller 215. In one embodiment, the position sensor 220 is a portion of a Global Positioning System ("GPS"). For example, the position sensor 220 may be a GPS receiver that provides a signal indicative of the location of the segmented antenna system 130(1), such as a standardized NA-182 output, to the controller 215. The position sensor 220 may also provide an identification signal associated with the segmented antenna system 130(1). In one embodiment, the identification signal is associated with the location signal so that the location signals corresponding to multiple segmented antenna systems 130(1-3) may be distinguished from each other.

The receiver 225 receives a signal transmitted by the target indicative or the target's location and provides the location information to the controller 215. In one embodiment, the signal is transmitted to the receiver 225 on a frequency band that is different than the band that is used by the segmented antennas 140(1-3) to establish the wireless data link. For example, the survey vessel 110(2) may transmit a signal containing GPS information indicative of the location of the survey vessel 110(2) to the survey vessel 110(1) in a IHF frequency band while the wireless data link is established at about 2.4 GHz. However, the receiver 225 is not limited to receiving signals transmitted in the UHF frequency band. In alternative embodiments, the location information may be transmitted to the receiver at about 900 MHz, about 450 MHz, VHF frequencies, and the like. In another alternative embodiment, the location information may be transmitted to the receiver 225 via a satellite link.

The wireless data link established by transmitting the location signal on the frequency band that is different than the band that is used by the segmented antennas 140(1-3) may be more robust For example, an interrupted wireless data link may be re-established more quickly by transmitting the location signal to the segmented antenna system 140(1-3) on the frequency band that is different than the band that is used by the segmented antennas 140(1-3) to form the wireless data link.

Although the embodiment of the segmented antenna system 130(1) illustrated in FIG. 2 determines the direction from the segmented antenna 140(1) to the target using the positional information provided by the position sensor 220 and the receiver 225, the present invention is not limited to using positional information such as GPS data. In alternative embodiments, any desirable method of determining the direction to the target, such as radar sensing by radar devices (not shown) located on the survey vessels 110(1-3), may be used.

Figure 3:
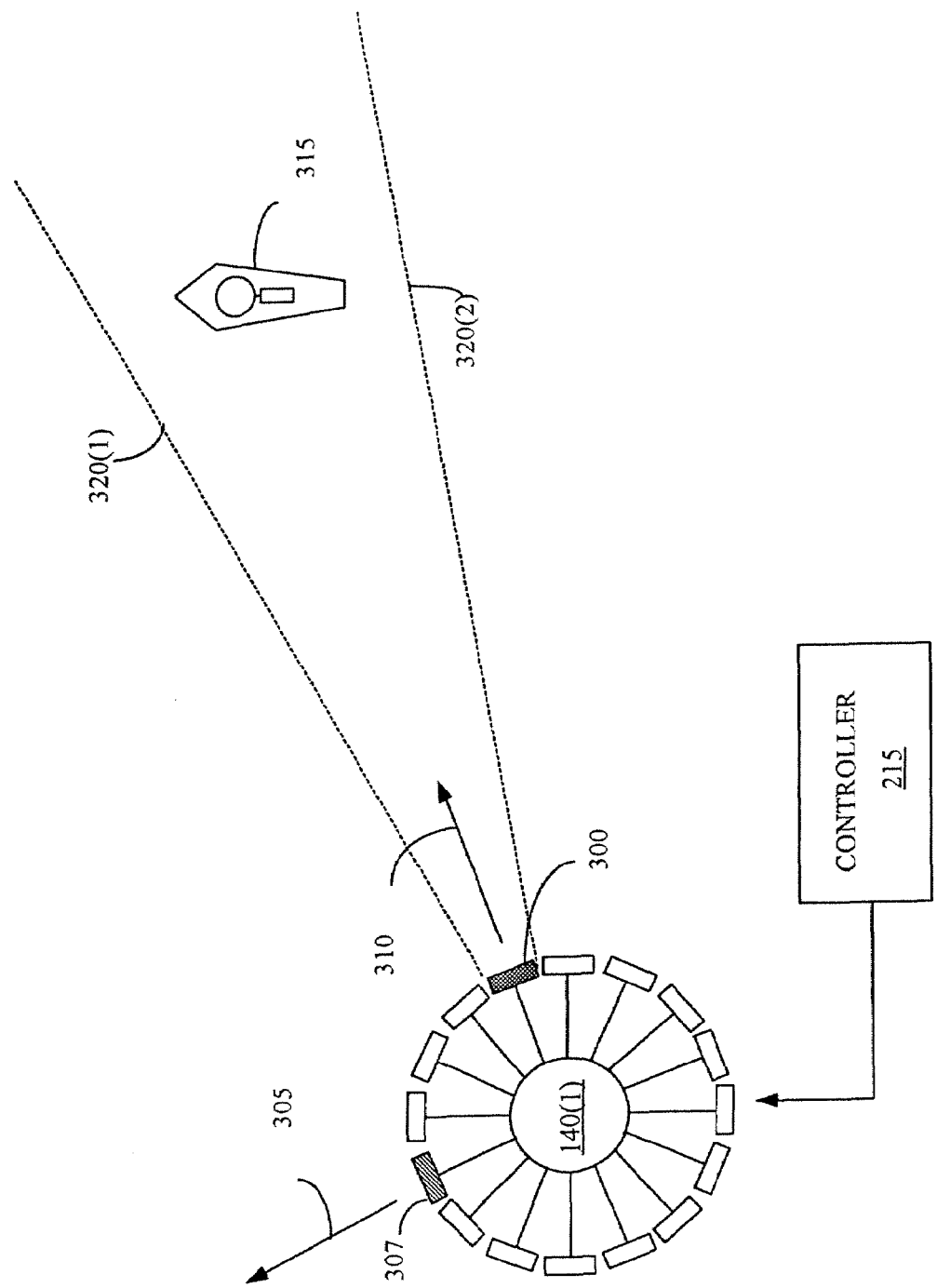
FIG. 3 conceptually illustrates the operation of a selected segment of a segmented antenna such as may be found in the segmented antenna system illustrated in FIG. 2.

FIG. 3 conceptually illustrates the operation of a selected segment 300, indicated by cross-hatching, of the segmented antenna 140(1). In the illustrated embodiment, an orientation 305 of a reference segment 307 of the segmented antenna 140(1) is determined. However, in alternative embodiments, the orientation 305 of the segmented antenna 140(1) may be approximately equal to a heading of any feature that has a known geometric relation some portion of the segmented antenna 140(1). A direction 310 to the vessel 315 is also determined.

The controller 215 then uses the determined orientation 305 of the segmented antenna 140(1) and the determined direction 310 to select a segment 300, which may be used to form the wireless data link. In the illustrated embodiment, the controller 215 may select a segment 300 by determining that the direction 310 to the vessel 315 lies within a transmission and/or reception angle, indicated in FIG. 3 by the dashed lines 320(1-2). For example, the controller 215 may select the segment 300 by comparing the relative angle between the determined orientation 305 and the determined direction 310 with the relative angle between the reference segment 307 and the selected segment 300. The selected segment 300 may then be used to establish a wireless data link between the segmented antenna 140(1) and the vessel 315.

Referring back to FIG. 2, in one set of embodiments, as described above, the segments 200 may overlap, in which case a hysteresis may be used to select the appropriate segment 200. For example, if the segments 200 overlap by approximately 4.degree., a survey vessel 110 (2-3) crossing through the overlap will be assigned to a new segment 200 once it has passed approximately 3 degrees into the overlap as measured from the entry side of the new segment 200. To be re-assigned to the previous segment 200, the survey vessel 110(2-3) may move back to 1 degree into the overlap measured from the same side of the new segment 200, or 3 degrees measured from the entry side of the previous segment 200.

However, it will be appreciated by those of ordinary skill in the art, that the overlap is not necessary for the practice of the present invention. In various alternative embodiments, there may be no overlap between the segments 200. Furthermore, it will be appreciated by those of ordinary skill in the art, a hysteresis is not necessary to the practice of the present invention. Any of a variety of methods of assigning the segments 200 may be used.

In one alternative embodiment, sometimes referred to as an "adaptive array," a plurality of segments 200 may be selected to form the wireless data link for transmission and/or reception of signals. The selection of the number of segments 200 may depend on the desired transmission/reception range of the wireless data link. For example, if the range 120(1) shown in FIG. 1 is reduced, a larger number of segments 200 may be used for transmission and/or reception. In one embodiment, the plurality of segments 200 may be selected by selecting a central segment 200 and one or more segments 200 adjacent the central segment 200.

A signal processing unit 230 is coupled to the segmented antenna 140(1). When signals are received via the wireless data link, the segmented antenna 140(1) may provide the received signals to the signal processing unit 230, which may at least partially process the data. The signal processing unit 230 may also provide a signal to the segmented antenna 140(1), which may be transmitted via the wireless data link. In one embodiment, the signal processing unit 230 includes a filter 235. For example, the filer 235 may be a narrow-band filter centred on a frequency of about 2442 MHz and having a 3 db bandwidth of about 24 MHz. Noise in the wireless data link may be reduced by incorporating the filter 235 in the signal processing unit 230.

In one embodiment, the segmented antenna system 130 may include an antenna 240 vertically displaced from the segmented antenna 140. For example, the antenna 240 may be a conventional omni-directional antenna deployed above the segmented antenna 140(1) on a mast (not shown). The signal processing unit 230 may reduce multi-path fading caused by sea-surface reflection of the wireless data link signal by combining the signals received by the segmented antenna 140(1) and the antenna 240 in a manner well known to persons of ordinary skill in the art. Consequently, the wireless data link formed using the segmented antenna system 130(1) and the antenna 240 may have not have gaps around a range 120(3), allowing the wireless data link to be formed between the survey vessel 110(1) and the survey vessel 110(3), as shown in FIG. 1. For example, the 2.4 GHz dead zone at 9-10 kilometers may be reduced, or even removed, thereby allowing a wireless data link to be formed with the survey vessel 110(3) at the range 120(3) of about 9-10 kilometers. However, it will be appreciated that the antenna 240 is optional and not necessary for the practice of the present invention.

Figure 4:
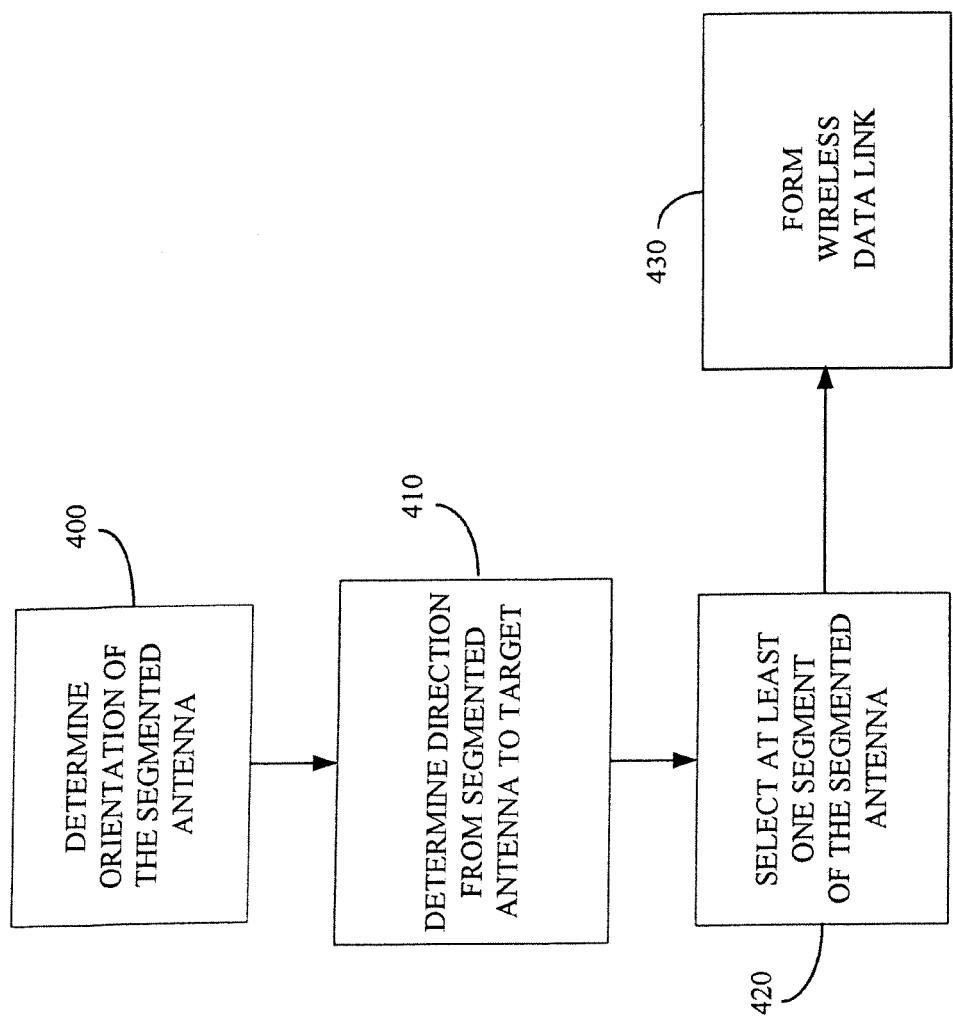
FIG. 4 conceptually illustrates a method of selecting a segment of a segmented antenna that may be used by the segmented antenna system illustrated in FIG. 2.

FIG. 4 conceptually illustrates a method of selecting the segment 300 of the segmented antenna 140(1) that may be used by the segmented antenna system 130(1). The controller 215 determines (at 400) the orientation 150(1), e.g. relative to magnetic North, of the segmented antenna 140(1) and determines (at 410) the direction 160(1) from the segmented antenna 140(1) to a target As discussed in detail above, the direction 160(1) may be determined using the GPS locations of the survey vessel 110(1-3). Furthermore, in various alternative embodiments, the target may be an omni-directional antenna, another segmented antenna 140(2-3), or other like transmission and/or reception device.

The controller 215 then selects (at 420) at least one segment 200 of the segmented antenna 130(1) using the determined orientation 150(1) and the determined direction 160 (1). A wireless data link may then be formed (at 430) using the selected segment 200 so that signals may be transmitted and/or received using the selected segment 200; By selecting (at 420) at least one appropriate segment 200 and forming (at 430) the wireless data link using the at least one segment 200 according to the above method, the range of the wireless data link may be extended and, in some embodiments, gaps in the range of the wireless data link may be reduced and/or removed, as previously discussed. Moreover, the minimal number of moving parts required to operate the segmented antenna system 130(1) according to the above method allows moving targets to be acquired and/or reacquired in a shorter time relative to antennae that rotate to acquire targets. In addition, the segmented antenna system 130(1) may have an increased operational lifetime and reduced maintenance costs and downtime relative to systems that utilize more moving parts.

Figure 5A:
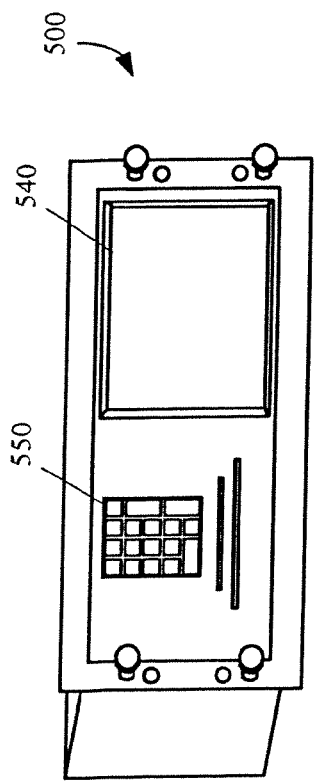
FIGS. 5A and 5B conceptually illustrate a computing apparatus that may be used to perform the method described in FIG. 4.
Figure 5B:
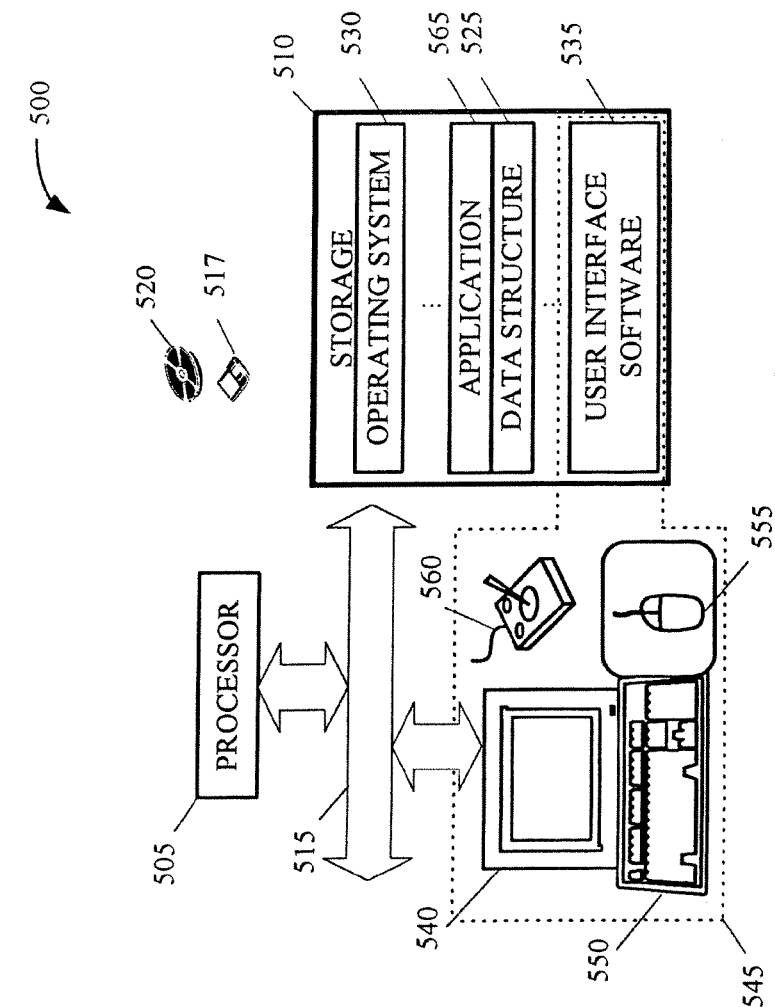

The controller 215 may be embodied, at least in part, in a computing apparatus 500 that may be used to perform the aforementioned operations, as illustrated in FIGS. 5A and 5B. The computing apparatus 500 includes a processor 505 communicating with some storage 510 over a bus system 515. The storage 510 may include a hard disk and/or random access memory ("RAM") and/or removable storage such as a floppy magnetic disk 517 and an optical disk 520. The storage 510 is encoded with a data structure 525 storing the signals collected as discussed above, an operating system 530, user interface software 535, and an application 565. The user interface software 535, in conjunction with a display 540, implements a user interface 545. The user interface 545 may include peripheral I/O devices such as a key pad or keyboard 550, a mouse 555, or a joystick 560. The processor 505 runs under the control of the operating system 530, which may be practically any operating system known to the art. The application 565 is invoked by the operating system 530 upon power up, reset, or both, depending on the implementation of the operating system 530.

As discussed above, data collected during the marine seismic survey may be communicated to the computing apparatus 500 via any storage medium, including, but not limited to, magnetic and optical storage media such as recording tape, magnetic disks, compact disks, and DVDs. The data collected during the marine seismic survey may also be communicated directly to the computing apparatus 500 and stored in the storage 510 via wires, cables, wireless data links, and the like. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fibre, or some other suitable transmission medium known to the art The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising:
   a segmented antenna having a plurality of segments, each segment being capable of transmitting and receiving signals;
   a position sensor adapted to provide a positioning signal indicative of a position of the segmented antenna;
   an orientation sensor adapted to provide an orientation signal indicative of an orientation of the segmented antenna;
   a receiver adapted to receive a target positioning signal indicative of a position of a target antenna; and
   a controller adapted to select at least one of the segments using the positioning signal, the target positioning signal, and the orientation signal.

2. The apparatus of claim 1, wherein each segment is adapted to form a wireless data link between the segmented antenna and the target antenna.

3. The apparatus of claim 2, wherein the segmented antenna comprises 16 segments.

4. The apparatus of claim 3, wherein each segment is capable of transmitting and receiving signals within an angle of about 26°, and wherein the angles overlap by about 4°.

5. The apparatus of claim 1, wherein the controller is adapted to select at least one of the segments using a hysteresis.

6. The apparatus of claim 1, wherein the receiver is adapted to receive signals in at least one of a UHF band, a VHF band, and a satellite link.

7. The apparatus of claim 1, wherein the position sensor is a Global Positioning System device.

8. The apparatus of claim 1, wherein the orientation sensor is a gyrocompass or a compass.

9. The apparatus of claim 1, wherein the target antenna is an omni-directional antenna.

10. The apparatus of claim 1, further comprising an antenna vertically displaced from the antenna.

11. The apparatus of claim 10, wherein the vertically-displaced antenna is vertically displaced from the segmented antenna by about 6 meters.

12. The apparatus of claim 10, further comprising a signal processing unit adapted to combine signals received from the segmented antenna and the vertically-displaced antenna.

13. The apparatus of claim 12, wherein the signal processing unit comprises a band-pass filter.

14. The apparatus of claim 10, wherein the vertically-displaced antenna is an omni-directional antenna.

15. The apparatus of claim 1, wherein the orientation of the segmented antenna is a heading of a vessel.

16. An apparatus, comprising:
    a segmented antenna having a plurality of segments, each segment being capable of at least one of transmitting and receiving signals;
    a position sensor adapted to provide a positioning signal indicative of a position of the segmented antenna;
    an orientation sensor adapted to provide an orientation signal indicative of an orientation of the segmented antenna;
    a receiver adapted to receive a target positioning signal indicative of a position of a target antenna;
    a controller adapted to select at least one of the segments using the positioning signal, the target positioning signal, and the orientation signal; and
    wherein the target antenna comprises a plurality of segments, each segment being capable of at least one of transmitting and receiving signals, and further comprising:
    a target position sensor adapted to provide the target positioning signal indicative of the position of the target antenna;
    a target orientation sensor adapted to provide a target orientation signal indicative of an orientation of the target antenna;
    a target receiver adapted to receive the positioning signal indicative of the position of the segmented antenna; and
    a target controller adapted to select at least one of the segments of the target antenna using the positioning signal, the target positioning signal, and the target orientation signal.

17. A system, comprising:
    a plurality of antennae deployed at a plurality of locations, at least one of the antennae being a segmented antenna having a plurality of segments, each segment being capable of transmitting and receiving signals;
    a plurality of positioning sensors adapted to provide a corresponding plurality of positioning signals indicative of the plurality of locations;
    at least one orientation sensor adapted to provide a signal indicative of an orientation of the at least one segmented antenna; and
    at least one controller adapted to select at least one of the segments of the at least one segmented antenna using the plurality of positioning signals and the at least one orientation signal.

18. The system of claim 17, wherein the at least one controller is adapted to form a wireless data link between the segmented antenna and at least one of the plurality of antennas on a first frequency band.

19. The system of claim 18, further comprising at least one receiver coupled to the at least one controller, the receiver being adapted to receive the plurality of positioning signals via a second frequency band different than the first frequency band and provide the plurality of positioning signals to the controller.

20. The system of claim 19, further comprising at least one antenna vertically displaced from the at least one segmented antenna.

21. The system of claim 20, further comprising a signal processing unit adapted to combine a signal from the vertically-displaced antenna and a signal from the at least one segmented antenna.

22. The system of claim 21, wherein the signal processing unit comprises a band-pass filter.

23. The system of claim 17, wherein the plurality of locations include at least one of a moving vehicle and a fixed-position structure.

24. The system of claim 23, wherein the moving vehicle comprises at least one of a ship and a buoy.

25. The system of claim 23, wherein the fixed-position structure includes at least one of a landbased tower and an off-shore platform.

26. The system of claim 17, wherein the plurality of positioning sensors are a plurality of Global Positioning Systems.

27. The system of claim 17, wherein the at least one orientation sensor is a gyrocompass or a compass.

* * * * *